Dec. 1, 1925.                                                                       1,563,388
C. L. MATTISON ET AL
WORK GUIDING MEANS FOR MOLDING MACHINES AND THE LIKE
Filed March 24, 1924
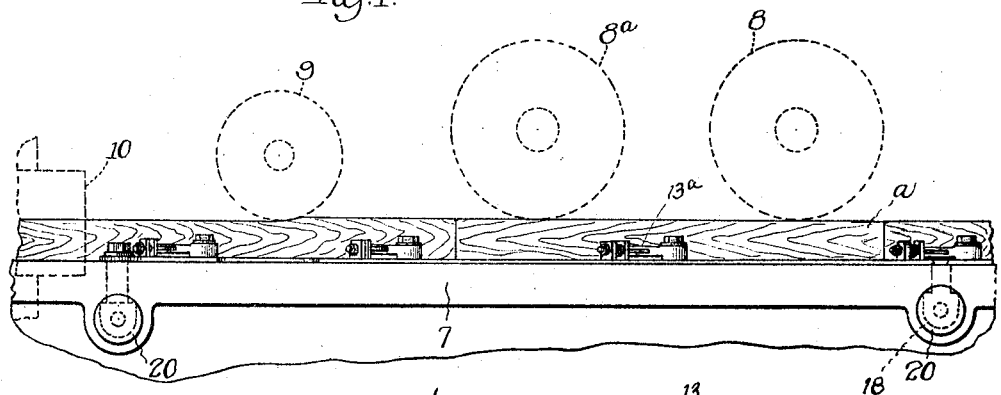
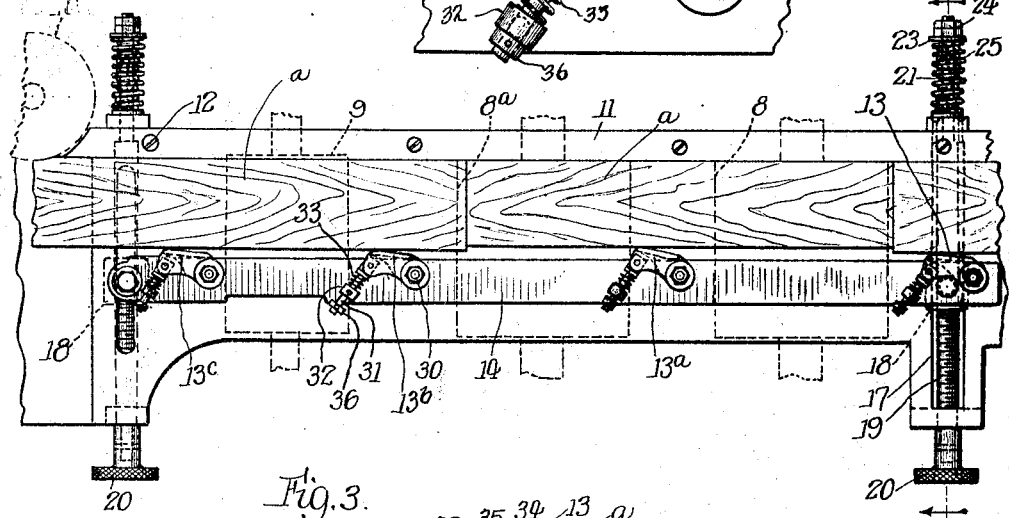
Inventor:
C. L. Mattison,
W. O. Vivarttas, Patented Dec. 1, 1925.

1,563,383

UNITED STATES PATENT OFFICE.

CARL LAWRENCE MATTISON AND WILLIAM O. VIVARTTAS, OF ROCKFORD, ILLINOIS, ASSIGNORS TO MATTISON MACHINE WORKS, OF ROCKFORD, ILLINOIS, A CORPORATION OF ILLINOIS.

WORK-GUIDING MEANS FOR MOLDING MACHINES AND THE LIKE.

Application filed March 24, 1924. Serial No. 701,276.

*To all whom it may concern:*

Be it known that we, CARL LAWRENCE MATTISON and WILLIAM O. VIVARTTAS, citizens of the United States, residing at Rockford, in the county of Winnebago and State of Illinois, have invented a certain new and useful Work-Guiding Means for Molding Machines and the like, of which the following is a specification.

The invention relates to woodworking machines of the type in which separate pieces of work are fed successively into engagement with cutting or shaping knives; and the general object of the invention is to provide an improved means for guiding the work in its travel to insure that it shall be properly positioned for engagement by said knives.

In the use of woodworking machines of the character indicated, the stock, having first been reduced to an approximately uniform size, is guided successively into engagement with one or more feed rolls and one or more cutters, and it will be obvious that when cutters are of the type adapted to shape the work as in molding machines, it is essential that the work be positioned properly by the guide means when it passes into engagement with the cutting means. In order thus properly to position the work, it is usually held in engagement with a fixed guide member; and it is essential that it be maintained under substantial side pressure. Because the work frequently varies in width, it is desirable that provision be made for maintaining the pressure upon pieces relatively narrow in width as well as upon those which are wider.

An important object of our invention is to provide guide means for the work adapted to accomplish the desired result above indicated and we attain this object by the provision of a movable guide device embodying a main pressure exerting means serving to maintain the work under a substantially high degree of side pressure and an auxiliary pressure exerting means operating independently of the main pressure means to maintain the narrower pieces of work also under pressure.

A further object of the invention is to provide a guide means which is capable of quick and easy adjustment to accommodate work of different widths.

A general object is to produce a guide means for woodworking machines which is of a thoroughly practical character, simple in construction and capable of economical manufacture.

The objects of the invention thus set forth together with other and ancillary advantages are attained by the construction and arrangement illustrated in the accompanying drawings forming part hereof, wherein Figure 1 is a fragmentary side view of a portion of a molding machine showing the feed table equipped with a guiding means constructed in accordance with our invention, the feed rolls and cutting heads being shown diagrammatically.

Fig. 2 is a fragmentary plan view of the same.

Fig. 3 is a fragmentary transverse sectional view through the feed table and illustrating more particularly the means for mounting the adjustable or yielding guide means, the view being taken approximately on line 3—3 of Fig. 2.

Fig. 4 is a detail view of one of the independently yielding guide shoes.

For purposes of illustration we have shown the feed table of a molding machine upon which the work is supported and guided for movement into engagement with the cutting and shaping knives. 7 designates the table upon which the work $a$ (herein shown in relatively short lengths) is fed by a pair of feed rolls shown diagrammatically at 8 and 8ª, into engagement with the cutting knives mounted on a top cutter head 9 and thence into engagement with a side edge cutter shown at 10. 11 is a stationary guide member of suitable construction mounted upon the upper side of the table at one edge thereof as shown clearly in Fig. 3. In the present instance this stationary guide is in the form of a long strip or bar rigidly secured to the table as by means of screws 12.

Our improved yielding guide means comprises a series of four guide shoes 13, 13ª, 13ᵇ and 13ᶜ mounted for independent movement upon a carrier bar 14 which in turn is mounted for lateral adjustment toward and from the stationary guide 11 as well as for bodily yielding movement. The opposite side edges of the table 7 are shown as provided with depending flanges 15 and 16 and near the opposite ends of the table there are provided transverse slots 17 adapted to receive and guide a nut 18 which is mounted upon a screw 19 for movement transversely of the table. Said screw is journaled at opposite ends in the flanges 15 and 16 of the table and is provided at the forward side of the table with a knurled head 20 for convenient manipulation. The rear end of the screw as herein shown is reduced in diameter to provide a shank 21 with a shoulder 22 adapted to engage the inner side of the rear flange 16 to limit the extent of rearward movement of the screw. Upon the free end of the shank a bearing washer 23 is held in position by means of a pair of nuts 24. Between the bearing washer 23 and the outer side of the flange 16 is interposed a pair of springs 25 and 26 tending to move the screw rearwardly.

The bar 14 is secured at each end to one of the guide nuts 18 (Fig. 2) as by means of a headed stud 27 anchored in a hole in the guide nut 18 as by means of a set screw 28.

Each of the shoes 13, 13ª, 13ᵇ and 13ᶜ has one end pivotally mounted upon the bar 14 as shown at 29, as by means of a headed pivot stud 30, and its other end is pivotally connected to a short rod 31 slidable in a pivoted guide member 32 also carried by the bar 14. A coiled expansion spring 33 encircles the stud 31 between the member 32 and the free end of the shoe, and tends to move the shoe inwardly against the work (Fig. 2). The pivotal connection between the rod 31 and the free end of the shoe comprises a T-shaped member 34 rigid with the rod and entering a bifurcation in the shoe (Fig. 3). Said member 34 provides a bearing for the spring, as shown at 35. The opposite or free end of the stud has a collar 36 pinned thereon for limiting the movement of the shoe by the spring 33.

Referring now to Figs. 2 and 3, the shoe carrying bar 14 is adjusted with respect to the width of the work $a$ so that when the latter is moved forwardly by the feed rolls between the fixed and movable guides, the movable guide device is forced outwardly against the action of the springs 25—26. These springs, it will be observed, are made heavier and stiffer than the springs 33 and the result is that said springs 33 are normally compressed substantially to their maximum. The springs 25, 26 and associated parts thus constitute a main pressure exerting means serving to maintain the work under a substantially high degree of side pressure. When one piece of work is relatively narrower than adjoining pieces, the individual guide shoes operate independently of the main pressure exerting means, through the action of their individual springs 33. These springs 33, therefore, and associated parts, constitute an auxiliary pressure exerting means for actuating the individual guide shoes independently.

To vary the pressure of the shoes upon the work the nuts 24 on the ends of the screws 19 may be readily adjusted; and to vary the position of the movable guide means to accommodate work of varying widths, it is only necessary to manipulate the screws 19 through the medium of the knurled heads 20.

It will be seen that we have provided a guide means of an advantageous construction capable of operating effectually to accomplish their intended function. Not only are they adapted to insure the proper positioning of the work with respect to the cutting means notwithstanding variations in the width of any specified work, but the guide means as a whole is capable of quick and easy adjustment to accommodate various types of work.

We claim as our invention:

1. In a woodworking machine, the combination of a work table, a stationary guide member for the work on said table, a plurality of independent spring pressed guide shoes, a carrier bar adapted to support said shoes so as to engage the side of the work opposite the stationary guide member, and means for supporting said carrier bar comprising a rod slidable transversely below the table, a nut screw-threaded on said rod and having said carrier bar secured thereto, and spring means tending to move said rod in a direction to hold the guide shoes in engagement with the work.

2. In a woodworking machine, the combination of a work supporting table, a fixed guide member for the work, said table having a transverse slot therein, a movable guide member, a bar upon which said movable member is mounted, a guide member to which said bar is secured and adapted to slide in said slot, and yieldable means for moving said guide member endwise relative to said slot.

3. In a woodworking machine, the combination of a work supporting table, a fixed guide member for the work, said table having a transverse slot therein, a pressure member, a bar upon which said pressure member is mounted, a guide member to which said bar is secured and adapted to slide in said slot, means for moving said guide member endwise relative to said slot comprising an adjusting rod having a screw-threaded engagement with said guide member and slidable transversely of the table, and means tending to move said rod in a direction to hold the pressure member in engagement with the work.

4. In a woodworking machine, the combination of a work supporting table having means providing a stationary guide for the work, of means for yieldably maintaining the work against said stationary guide comprising a plurality of pressure shoes, a supporting member upon which said shoes are pivotally mounted, spring means interposed between each of said shoes and its supporting means tending to urge the shoe into engagement with the work, and means including tensioning means for yieldably supporting the opposite ends of said supporting member adapted to hold said spring means under compression, said means being adjustable to vary the position of said supporting member transversely of the table without altering the tension of said tensioning means.

5. In a woodworking machine, the combination with means for supporting and guiding the work, of means yieldably maintaining the work against said guide means comprising a shoe, a support to which one end of said shoe is pivoted, a guide member pivoted on the supporting member, a slide rod operable in said guide member, a spring interposed between the guide member and said shoe, and means for moving said support toward the work to hold the spring under tension.

6. In a woodworking machine, the combination with means for supporting and guiding the work, of means for maintaining the work in operative association with said guide means comprising a supporting member, a shoe pivoted at one end to said supporting member, a slide rod pivotally connected to the other end of the shoe, a part pivoted on said supporting member in which said slide rod is mounted, and spring means acting between the supporting member and the shoe to cause it to move in a direction toward the work.

7. In a woodworking machine, the combination of a work supporting table, a fixed guide member for the work on said table, said table having depending front and rear flanges and a transverse slot therebetween, a pressure member, a bar upon which said pressure member is mounted, a guide member adapted to slide in said slot to which said bar is secured, an adjusting rod mounted for rotation in said depending flanges having screw threaded engagement with said guide member, and spring means acting on said rod tending to move said rod in a direction to hold the pressure member in engagement with the work.

In testimony whereof we have hereunto affixed our signatures.

CARL LAWRENCE MATTISON.
WILLIAM O. VIVARTTAS.